June 21, 1927.  R. E. L. SPARKS  1,633,138
GRASS CUTTER
Filed May 13, 1926
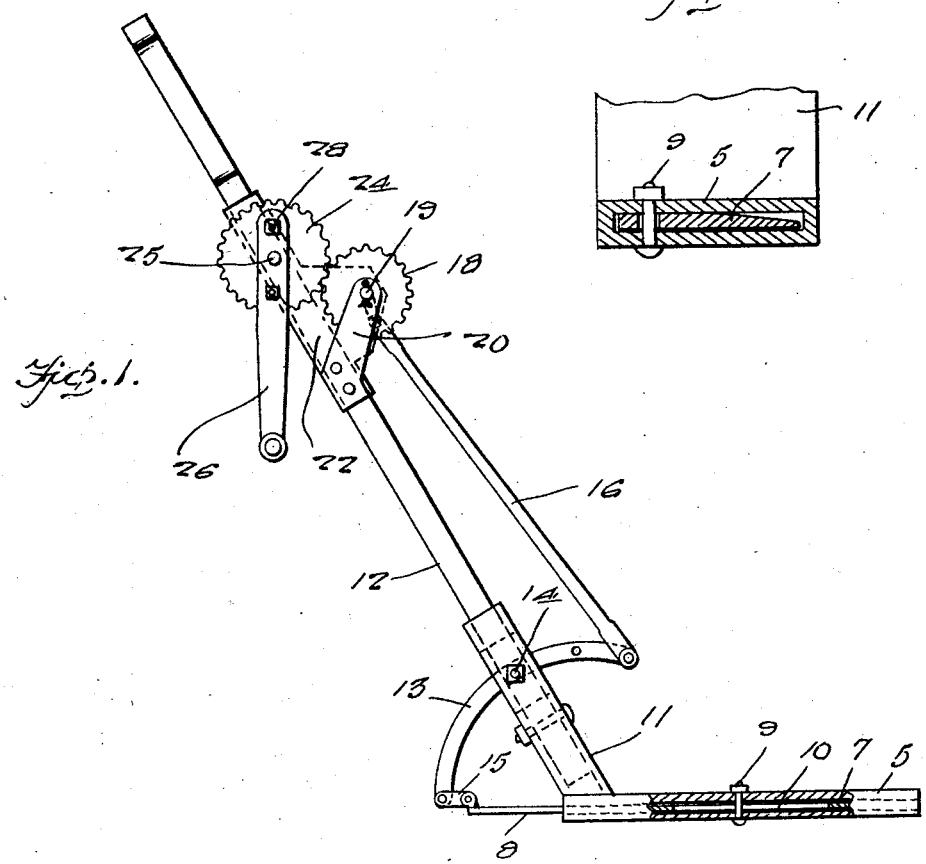
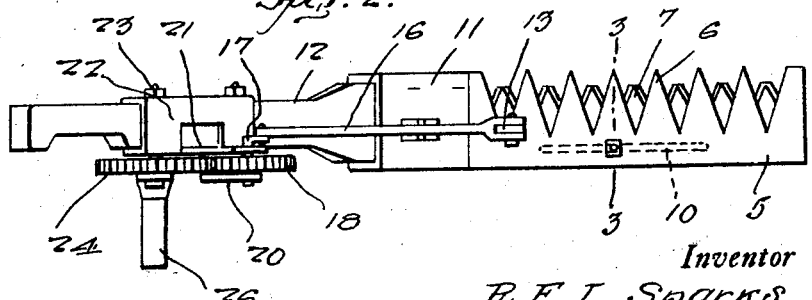
Inventor
R. E. L. Sparks
By Clarence A. O'Brien
Attorney Patented June 21, 1927.

1,633,138

UNITED STATES PATENT OFFICE.

ROBERT E. LEE SPARKS, OF PEMBERTON, WEST VIRGINIA.

GRASS CUTTER.

Application filed May 13, 1926. Serial No. 108,889.

The present invention relates to a grass cutter, and has for its principal object to provide a structure which is highly efficient as a supplement to a lawn mower for the purpose of cutting around in close places such as about a fence, flower beds or bushes, hedges, posts, and other things that might prove an obstacle to an ordinary lawn mower.

Another very important object of the invention resides in the production of a device of this nature which is exceedingly handy and of light construction, so that it may be conveniently used and carried about.

A still further very important object of the invention resides in the provision of a device of this nature with a very simple construction, which is thoroughly reliable in use and operation, one which has a compact arrangement of parts that are not likely to easily become out of order, one which may be manufactured at a low cost, and yet prove strong and durable, and one which is otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a side elevation of the contrivance embodying the features of my invention, Fig. 2 is a top plan view thereof, and Fig. 3 is a transverse sectional view taken substantially on the line 3—3 of Fig. 2.

Referring to the drawing in detail, it will be seen that the numeral 5 denotes a hollow guard having the usual guide fingers 6 and having mounted therein for rectilinear movement, a cutter element 7 of the usual formation. A shank 8 extends from the cutter element 7 thru one end of the guard 5. A bolt 9 extends through the guard 5 and through an elongated longitudinal slot 10 provided in the cutter element 7 so as to limit the movement of this cutter element in the guard.

A tubular extension 11 inclines upwardly to one side from the sides and has mounted in the upper end thereof, a handle bar 12. A lever 13 extends through the tubular extension 11 and is pivoted intermediate its ends as at 14. A link 15 is pivotally engaged with one end of the lever 13 and with the end of the shank 8 so that the rocking of the lever 13 will impart rectilinear motion to the cutter element.

A pitman 16 is attached to the other end of the lever 13 and also to a crank 17 operable by a gear 18 which is mounted on the shaft 19 journaled in the arms 20 and 21 of a bracket 22 fixed onto the handle bar 12 by means of suitable fastening elements 23. A gear 24 is journaled on a shaft 25 as is also a crank 26, said crank 26 being attached to the gear 24 as at 28. It will thus be seen that by the rotation of the crank 26, the gear 24 will be turned likewise and impart rotary motion to the gear 18, which motion will be transformed into oscillatory motion of the lever 13 through the intermediacy of pitman 16 and crank 17, and finally the oscillatory motion of the lever 13 will be transformed into rectilinear motion of the cutter through the intermediacy of the link 15.

From the above detailed description, it will be seen that I have produced and evolved an exceedingly handy implement which may be efficiently used in a reliable manner for cutting grass in close places where it would be impossible to cut the grass with the ordinary lawn mower. The implement would be useful, therefore, as a supplement to the ordinary lawn mower but, of course, can be used alone with exceptional efficiency.

The device is very easy to manipulate and will consume but little energy in its actual operation. All of the parts are compact so that the structure is convenient for assembly and disassembly and further takes up very little room when not in actual use.

The present embodiment of the invention has been disclosed in detail merely by way of example, since in actual practice it attains the features of advantage enumerated as desirable in the statement of the invention and the above description. The present embodiment, and other embodiments are subjected to many changes in the details of construction and in the combination and arrangement of parts without departing from the spirit or scope of the invention as hereinafter claimed, or sacrificing any of its advantages.

Having thus described my invention, what I claim as new is:—

1. A device of the class described including, in combination, a cutting mechanism, a tubular extension inclining upwardly and to one side of the cutting mechanism, a shank operatively associated with the cutting mechanism, a link on the shank, a lever pivotally mounted on the tubular extension, a handle bar extending from the tubular extension, and telescopically associated therewith, a pitman pivotally engaged with the other end of the lever, a bracket on the handle bar adjacent the upper end thereof, a pair of arms projecting from the bracket, a shaft journaled in the arms, a gear on said shaft, a crank extending from said shaft, and operatively engaged with the pitman, and means for operating the gear.

2. A device of the class described including, in combination, a cutting mechanism, a tubular extension inclining upwardly and to one side of the cutting mechanism, a shank operatively associated with the cutting mechanism, a link on the shank, a lever pivotally mounted on the tubular extension, a handle bar extending from the tubular extension, and telescopically associated therewith, a pitman pivotally engaged with the other end of the lever, a bracket on the handle bar adjacent the upper end thereof, a pair of arms projecting from the bracket, a shaft journaled in the arms, a gear on said shaft, a crank extending from said shaft, and operatively engaged with the pitman, a gear journaled on the bracket, a crank for operating the last mentioned gear, both of said gears being in mesh.

3. A device of the class described including, in combination, a cutting mechanism, a tubular extension inclining upwardly and to one side of the cutting mechanism, a shank operatively associated with the cutting mechanism, a link on the shank, a lever pivotally mounted on the tubular extension and having one end engaged with the link, a handle bar extending from the tubular extension and telescopically associated therewith, and means mounted on said handle for imparting rocking movement to the lever.

In testimony whereof I affix my signature.

ROBERT E. LEE SPARKS.